J. E. FALES.
Expanding Pulleys.

No. 137,352. Patented April 1, 1873.

WITNESSES:
F. L. Goulding.
E. E. Moor

INVENTOR:
Joseph E. Fales

AM. PHOTO-LITHOGRAPHIC CO. N.Y. (OSBORNE'S PROCESS.)

UNITED STATES PATENT OFFICE.

JOSEPH E. FALES, OF WORCESTER, MASSACHUSETTS, ASSIGNOR TO RICE, BARTON & FALES' MACHINE AND IRON COMPANY, OF SAME PLACE.

IMPROVEMENT IN EXPANDING PULLEYS.

Specification forming part of Letters Patent No. 137,352, dated April 1, 1873; application filed March 8, 1873.

*To all whom it may concern:*

Be it known that I, JOSEPH E. FALES, of the city and county of Worcester and Commonwealth of Massachusetts, have invented certain new and useful Improvements in Expanding Pulleys for Paper-Cutting Machines, and for other purposes; and I do hereby declare the following to be a clear, full, and exact description of the same, reference being had to the accompanying drawing, which forms a part of this specification, and in which—

Figure 1:
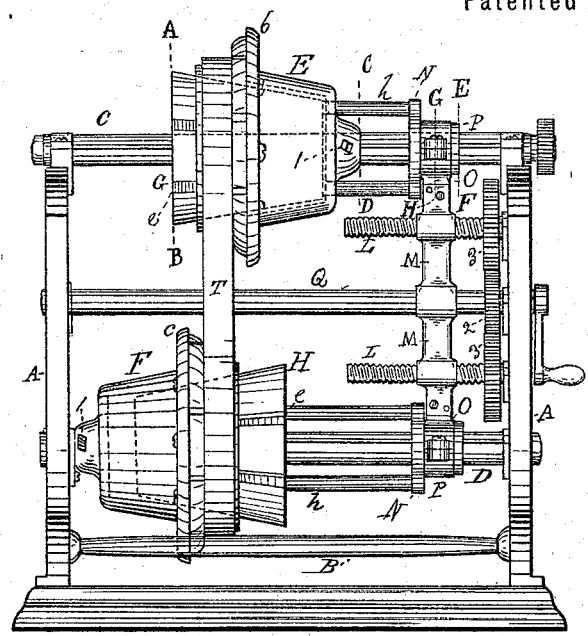
Figure 3:
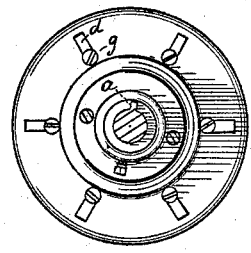
Figure 5:
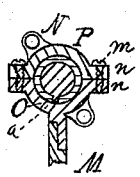
Figure 2:
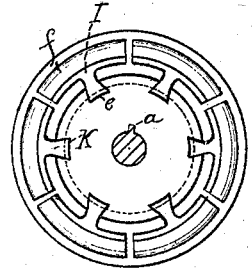
Figure 4:
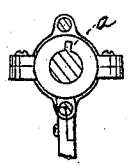

Figure 1 represents a side view of my said improvements. Fig. 2 represents a section on line A B, Fig. 1. Fig. 3 represents a section on line C D, Fig. 1. Fig. 4 represents a section on line E F, Fig. 1; and Fig. 5 represents a section on line G H, Fig. 1.

To enable those skilled in the art to which my invention belongs to make and use the same, I will proceed to describe it in detail.

In the drawing the parts marked A A are the end pieces of the supporting-frame, and which pieces are united by means of cross-rods B. Within the end pieces A are arranged proper bearings for the shafts C D to turn in, while upon said shafts, which are both provided with splines a running lengthwise thereof, are fastened (in this instance by set-screws 1) shells E F, the flanges b c of which are slotted out, as shown at d, Fig. 3. Within the shells E F are fitted to work slotted cone-shaped pieces G H. The grooves e in the cones G H are made in dovetail form, as fully indicated in Fig. 2. The parts I are adjustable pulley-sections, the shanks K of which are made to fit and work in the grooves e. The pulley-sections I are also provided with flanges f, which rest against the flanges b c of the cone-shells E and F, and screws or guide-pins g are passed through the slots d in the flanges b c into the flanges f of the belt-sections I, and by which the sections are steadied and retained in place when the slotted cone-pieces G and H are drawn out or forced in by the screws L L, as will be hereafter explained. The slotted cones G H are connected to the sliding frame M by means of the rods h, as follows: The head or bearing pieces N, which receive the outer ends of the rods h, are turned down to receive the boxes and caps O P, which are secured to the ends of slide-frame M, caps O being secured to the boxes P by means of screws or bolts m and ears n, as indicated in the drawing. The head-pieces N are provided with slots to fit the splines a in shafts C D, and consequently they revolve with said shafts and the shells and cones E F and G H. Frame M is fitted to slide freely on shaft Q, which is provided with a gear, 2, which takes into the gear 3 on the screws L, fitted to work in female threads in the frame M, while their outer ends are provided with heads and smooth bearings with suitable shoulders, whereby, while they turn freely in boxes in one of the frame-pieces A, they cannot move longitudinally.

It will thus be seen that by applying power to shaft Q, which can be done by crank S, or otherwise, the screws L will be rotated, and frame M, together with rods h and cones G H, will be moved back or forward, as the case may be. As a result of the movements of the cones G H in either direction the pulley-sections I on one cone will contract while those on the other will be expanded in the same degree, thereby increasing or decreasing the relative speed of the shafts C D. For instance, assuming that power is applied to shaft D to drive shaft C by means of the belt T, and it is desired to change or increase the speed of shaft C, while the speed of shaft D remains the same; then by turning shaft Q so as to force the cone H in and the cone G out, the object will be attained, and that too while the tension of belt T is maintained. When the speed of shaft C is to be lessened the operation is to be reversed.

My invention is particularly adapted for use in cutting paper into sheets as it is run from the paper-making machine, since the speed of shaft C can be changed or adjusted very accurately even while the machine is in operation. Then again as the belt T always runs on pulleys, the faces of which are parallel, it is not liable to slip or run off or to one side, and thereby vary the speed of the paper-cutting apparatus.

Those skilled in the art of making paper will readily appreciate my invention and its practical advantages.

Having described my improvements in expanding pulleys for cutting paper into sheets, what I claim therein as new and of my invention, and desire to secure by Letters Patent, is—

1. The combination, with the shafts C D, shells E F, and slotted cones G H, of the expanding pulley-sections I, sliding frame M, screws L, gears 2 3 3, and connecting-rods $h$, substantially as and for the purposes set forth.

2. The combination, with the shafts C D and shells E F, of the cones G H, expanding pulley-sections I, substantially as and for the purposes set forth.

JOSEPH E. FALES.

Witnesses:
F. L. GOULDING,
E. E. MOORE.